Feb. 26, 1935.  M. T. WALTER  1,992,849
FRUIT PICKER'S SACK
Filed Aug. 14, 1933
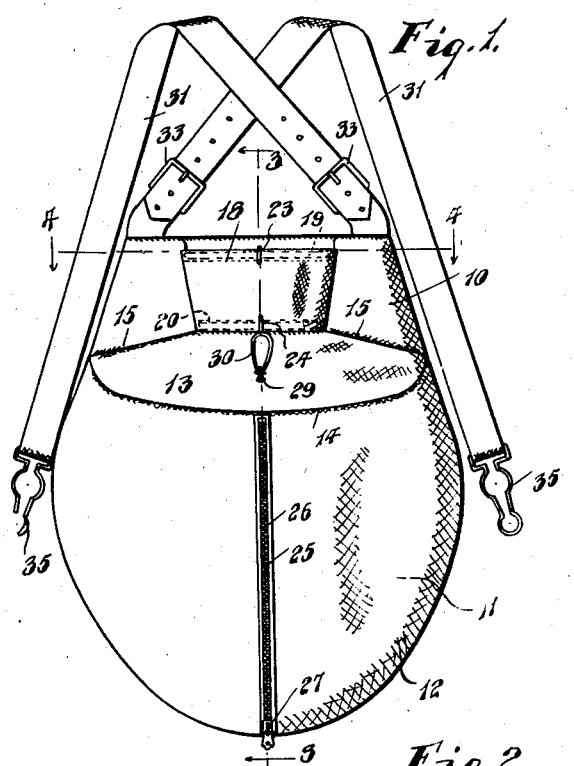
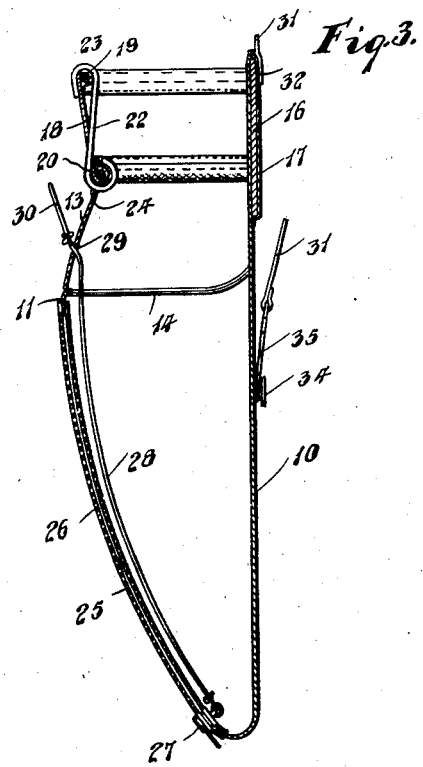
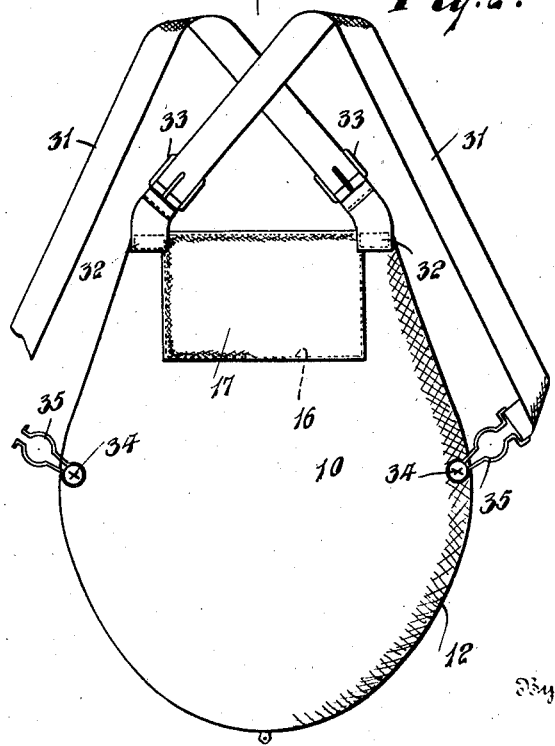
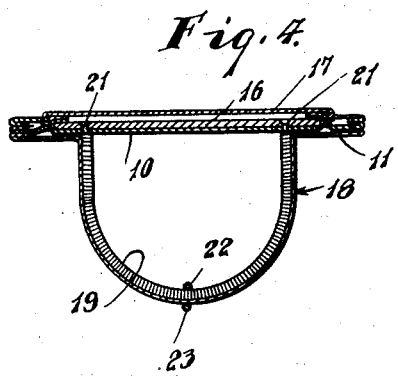
Inventor
Martin T. Walter.
By L. F. Randolph, Jr.
Attorney Patented Feb. 26, 1935

1,992,849

UNITED STATES PATENT OFFICE 1,992,849

FRUIT PICKER'S SACK

Martin T. Walter, Biglerville, Pa.

Application August 14, 1933, Serial No. 685,089

4 Claims. (Cl. 150—2)

The invention relates to sacks used by fruit pickers for containing the fruit while being picked, and has for one of its objects the provision of an improved opening for receiving the fruit into the sack comprising a funnel-shaped chute that is maintained in open position by resilient means so as to avoid danger of the chute being closed by engagement against the ladder or tree limbs the resilient means providing for maintaining the chute normally in open position and permitting it to move aside after engaging a fixed object and to immediately swing back to open position when the pressure is relieved.

A second object of the invention is the provision in a fruit picker's sack of an improved means for dumping the contents of the sack by providing a vertical opening in the front wall that is held normally closed by interengaging hooks on the opposite walls of the opening that are closed and opened by a runner, the runner being operated by means of a flexible member terminally emerging through an opening in the sack near its upper end so that the fruit picker can readily operate the runner for separating the interengaging hooks.

The invention will be described in detail hereinafter and will be found illustrated in the accompanying drawing in which Figure 1 is a front view of the bag, Figure 2, a rear view, Figure 3, a vertical sectional view on a plane indicated by the line 3—3 of Figure 1, and Figure 4 is a horizontal sectional view on a plane indicated by the line 4—4 of Figure 1.

In the drawing similar reference characters are used to designate corresponding parts in all the views.

The improved fruit picker's sack comprises a receptacle having a rear wall 10, a front wall 11 that is spaced farther from the rear wall 10 at its upper portion than on its curved lower edge 12, the upper edge of the front wall 11 having a shoulder piece 13 sewed thereto by means of a seam 14 and to the upper portion of the rear wall 10 along lines indicated at 15. The upper portion of the rear wall 10 is reinforced by means of a rigid plate 16 that may be of metal or any other suitable material, and covered by a returned fold 17 from the rear wall 10.

18 indicates a U-shaped chute that is secured to the rear wall opposite the plate 16, said chute communicating with the interior of the sack or receptacle through the opening formed by the shoulder 13 between the secured portions 15. The walls 10, 11, the shoulder 13 and the chute 18 are all made of flexible material such for instance as canvas or duck. Chute 18 is reinforced and distended by means of springs 19 and 20 that are mounted in tubular hems on the edges of the chute portion 18, and designated 21, the ends of the springs 19 and 20 being secured to the plate 16 and provide means whereby the chute 18 is normally held in expanded or distended position as shown in the drawing, but permitting disfigurement of the chute temporarily should the fruit picker accidentally engage the chute with his ladder or a tree limb, the chute portion being immediately distended as soon as pressure is relieved. 22 indicates a base member having hooks 23 and 24 on its opposite ends to engage around the springs 19 and 20, respectively.

The front wall 11 is provided with a discharge opening 25 that is closed by a series of interengaging hooks 26, and 27 is a runner for engaging and disengaging the hooks, this type of fastener being of the "Zipper" type. As it is desirable that the runner 27 be operated when the bag is full of fruit so that the fruit may be conveniently dumped and it would be inconveient to manually engage the runner 27 when the bag is filled, means have been provided whereby the runner may be operated to disengage the hooks 26, consisting of a cord or other flexible member 28 secured to said rubber 27, and having its free end extended through an opening 29 in the shoulder portion 13 and provided with a loop 30 for convenience in operating it by the fruit picker. It will be apparent that when the bag is filled with fruit it is only necessary to hold the front of a bag over a receptacle such as a basket or barrel and by pulling the flexible member 28 by means of the loop 30 the runner 27 will disengage the hooks 26 so that the fruit may be discharged from the bag. After discharge of the fruit from the bag the hooks will be reengaged by manually pulling downwardly on the runner 27.

In order to hold the bag in convenient position for the fruit picker, which is usually in front of him, it has been the practice heretofore in fruit picker's bags to provide a harness to support the bag on the shoulders, but such harnesses have usually been uncomfortable and tiring because most of the weight was carried by the back of the fruit picker. I have provided means whereby the bag may be held comfortably on the shoulders of the fruit picker, and to more evenly distribute the weight of the loaded bag, this harness consisting of straps 31 that are secured as shown at 32 to the top of the rear wall 10, being preferably adjustable in length by means of buckles 33. The straps 31 are crossed behind the back of the wearer and are provided with detachable fastening means of any preferred type, such for instance as buttons 34 and loops 35, though obviously any other detachable fastening means such for instance as a hook and loop or the like may be substituted therefor.

It will be readily understood that the sack is a marked improvement over the sacks now in use not only because of the arrangement for holding the sack on the body, as heretofore explained, and the conveniently operated discharging opening, and the spring means for distending the chute, but the chute being reduced relatively to the size of the bag has a tendency to prevent the fruit from spilling out through the top in descending a ladder after picking a bag full. It will also be apparent that by providing the runner 27 mounted on interengaging hooks 26 so that it is moved upwardly from the lower end of the receptacle wall 11, the size of the opening for discharge of the fruit may be adjusted as may be necessary to prevent bruising in discharging it.

What is claimed is:—

1. In a fruit picker's sack, a receptacle having means for supporting it, a flexible filling chute communicating with said receptacle including a U-shaped wall, and coil springs secured to and defining said U-shaped wall to hold said chute normally expanded and permitting disfigurement of said walls temporarily.

2. In a fruit picker's sack, a receptacle having means for supporting it, a rigid plate secured to a wall of the receptacle, a U-shaped flexible chute secured to said plate and communicating with the receptacle, and coil springs terminally secured to said plate and engaging the chute to normally hold the chute expanded and permitting disfigurement of the chute temporarily.

3. In a fruit picker's sack, a receptacle having means for supporting it, a rigid plate secured to a wall of the receptacle, a U-shaped flexible chute secured to said plate and communicating with the receptacle, and coil springs terminally secured to said plate and reinforcing said chute to normally hold it expanded.

4. In a fruit picker's sack, a flexible receptacle having means for suspending it from the shoulders of an operator and having a discharging opening in its front wall, interengaging and releasable hooks on opposite walls of said opening, a runner slidably mounted on said hooks for releasing and engaging them, and a flexible member secured to said runner to slide it in releasing the hooks, the front wall of said receptacle having an opening through which said flexible member extends in convenient position for operation in opening the receptacle for discharge of its contents, said runner being adjustably movable from the lower portion of the receptacle to provide means for adjusting the opening in the receptacle.

MARTIN T. WALTER.